United States Patent [19]
Haeberle et al.

[11] Patent Number: 5,762,089
[45] Date of Patent: Jun. 9, 1998

[54] HARDFACE COATING FOR SEAL SURFACES IN A GATE VALVE

[75] Inventors: Sue F. Haeberle; Christi Hambrick, both of Spring; Jack Havens; Manuel Maligas, both of Houston; Brian Swagerty; John C. Vicic, both of Spring, all of Tex.

[73] Assignee: FMC Corporation, Chicago, Ill.

[21] Appl. No.: 650,209

[22] Filed: May 20, 1996

Related U.S. Application Data

[63] Continuation of Ser. No. 435,043, May 8, 1995, abandoned, which is a continuation of Ser. No. 262,174, Jun. 20, 1994, abandoned.

[51] Int. Cl.$^6$ .................. F16L 55/18; F16K 3/00
[52] U.S. Cl. .................. 137/15; 251/326; 251/327; 251/368
[58] Field of Search .................. 137/375, 15; 251/368, 251/326, 327, 328, 329

[56] References Cited

U.S. PATENT DOCUMENTS

| | | | |
|---|---|---|---|
| 3,871,616 | 3/1975 | Taylor | 251/368 |
| 4,862,907 | 9/1989 | Ledtje et al. | 137/512 |
| 5,002,662 | 3/1991 | Ledtje et al. | 137/512 |

*Primary Examiner*—A. Michael Chambers
*Attorney, Agent, or Firm*—Henry C. Query, Jr.

[57] ABSTRACT

A gate valve for use in a high pressure line has a movable gate and a static seat within a valve body. The seat has a seat face which is in sliding contact with a gate face. The seat and gate faces are coated with an amorphic coating which hardens when the seat face and gate face are subjected to manufacturing processes or rubbed together during valve opening and closing. A leak resistant seal between the seat and gate faces results when the valve is closed and subjected to high line pressure.

11 Claims, 1 Drawing Sheet

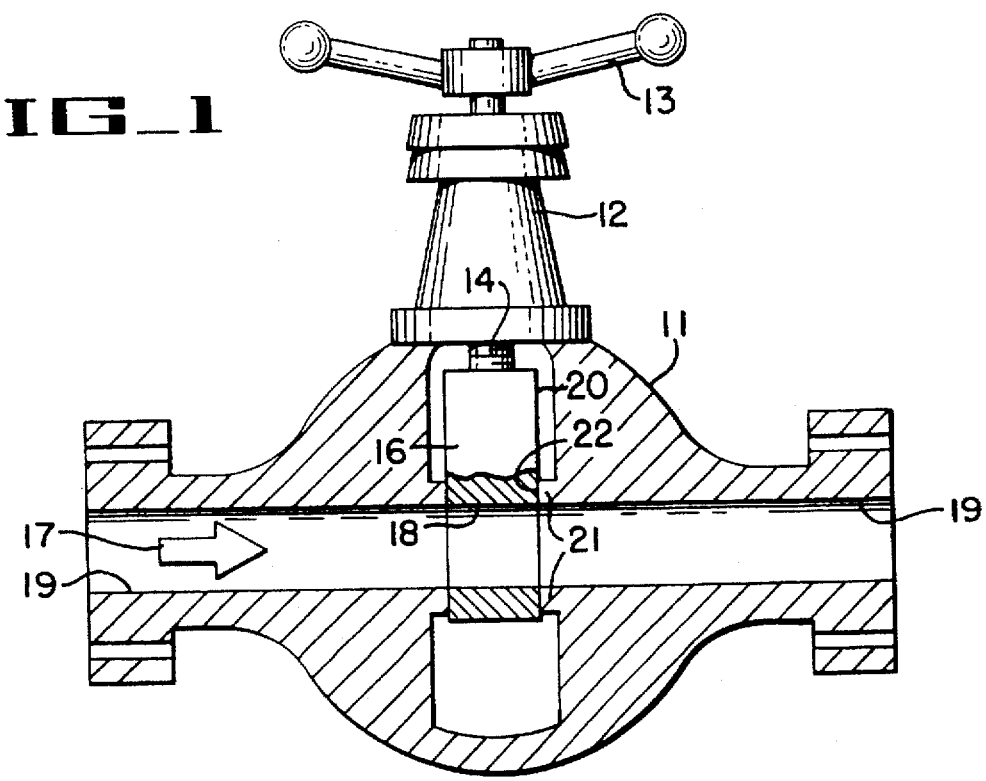
FIG_1
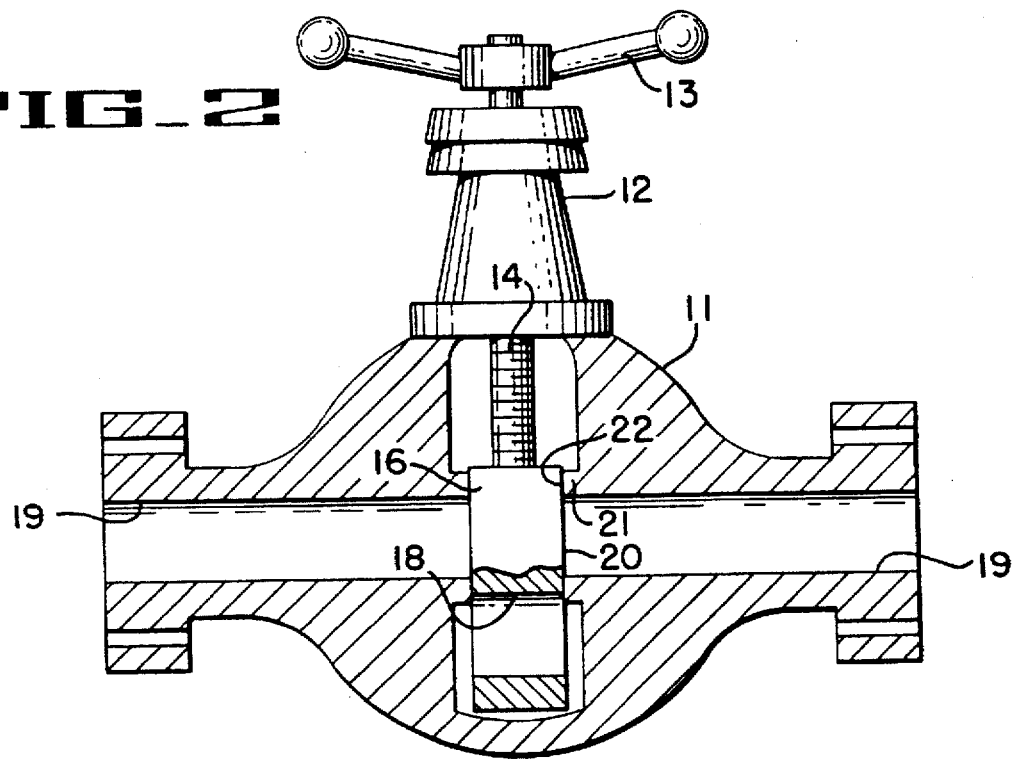
FIG_2

HARDFACE COATING FOR SEAL SURFACES IN A GATE VALVE

This application is a continuation of application Ser. No. 08/435,043, filed May 8, 1995, now abandoned, which is a continuation of application Ser. No. 08/262,174, filed Jun. 20, 1994, now abandoned.

SUMMARY OF THE INVENTION

The invention disclosed herein relates to a leak resistant gate valve which is subject to high pressure across the valve when it is in a closed condition. The valve includes a valve body, a valve seat formed within the valve body, and a valve seat face on the valve seat. Also included is a valve gate which is disposed within the valve body and is movable between open and closed positions therewithin. A gate face is formed on the valve gate and is disposed for sliding contact with the valve seat face as the gate is moved between the open and closed positions. An amorphic coating is placed on the valve seat face and on the gate face to prevent galling of the faces, so that a leak free seal is provided in the valve closed position with high pressure across the valve.

BRIEF DESCRIPTION OF THE DRAWINGS

FIG. 1 is a section view through an open gate valve assembly containing the features of the present invention.

FIG. 2 is a section view through a closed gate valve assembly containing the features of the present invention.

DESCRIPTION OF THE PREFERRED EMBODIMENT

The faces of gates and seats used in gate valves for oil and gas production must be capable of withstanding extremely high contact stresses without galling of the material constituting the gate and seat faces. A leak resistant seal between a valve gate face and a valve seat face requires elimination of galling at the faces. Elimination of galling at high pressure loads in the line containing the gate valve has posed a major problem. The highest contact stresses between the gate face and the seat face occur when the valve is in the closed position and full rated pressure is applied across the gate and the gate is moved toward the valve open position. The gate and seat faces must be flat within ten light bands and have a surface finish of 32 rms or less to provide a leak resistant seal at high line pressures. Additionally, the valve gates and valve seats are required to cut wire, cables or tubing which is passed through the valve. They must still be capable of sealing with no leakage when the valve is closed against line pressure.

With reference to FIG. 1, a valve body 11 is shown in section having the usual tower 12 and turning handle 13 attached thereto which function to extend or retract a threaded member 14. The threaded member is attached to a valve gate 16 so that turning of the handle 13 moves the valve gate between an open position as shown in FIG. 1 and a closed position as seen in FIG. 2 as the threaded member alternately is retracted and extended respectively. Flow through the valve body 11 is the result of pressure in the line in which the valve body is situated and is represented in FIG. 1 by the arrow 17. As seen in FIG. 1, an opening 18 in the valve gate 16 is aligned with a flow passage 19 through the valve body 11 to allow flow through the valve. Alternatively, when the threaded member 14 is extended by turning the handle 13 the valve gate 16 is lowered within the valve body 11 as seen in FIG. 2, and the flow passage 19 through the valve is blocked by the solid upper portion of the valve gate.

Valve gate 16 has a gate face 20 which extends over the entire side of the gate on the downstream side thereof. Adjacent to the valve gate face 20 is a valve seat 21 formed in the valve body 11 and having a seat face 22 thereon in contact with the valve gate face 20. The valve seat 21 surrounds the flow path 19 at the contact with the gate face 20. A hard facing is applied to both the valve gate face 20 and the seat face 22 which in addition has the flatness and surface finish characteristics mentioned hereinbefore. The hard facings preferred have an amorphous structure. One metamorphic metal hard facing overlay is sold under the trademark "Armacor". These overlays have the unique property of transforming a thin surface layer of crystalline elements into an amorphous structure when the overlaid surface is severely rubbed. The amorphous structure provides increased wear resistance and a lower coefficient of friction between the rubbing surfaces than other known hard facings. In addition to excellent wear resistance, amorphous hard facings are found to provide leak resistant seals between the valve gate face 20 and the valve seat face 22 even after wire, cable and tubing have been sheared by movement of the valve gate 16 from an open to a closed position.

Benefits obtained from the application of amorphic coatings to the valve gate face 20 and the valve seat face 22 include prolonged service life of the gate valve and lower operating torque at the handle 13 for movement of the gate between open and closed positions within the valve body 11. For standard service valves, amorphic hard facing have hard facing thicknesses of less than 0.01 inches. Amorphic hard face gates and seats for wire shear service have utilized a coating thickness between 0.01 and 0.025 inches. The amorphic coating is applied on the flat sealing surface of the gate and the valve seat and in some cases within the bore of the gate and the valve seat. ARMACOR contains chromium and metalloids, which permit the metamorphic transformation under pressure and sliding surface conditions. The hardening phenomenon related to this coating procedure is the transformation from a two phase crystalline alloy to a complex stable amorphous hard phase alloy under surface abrasion. The grinding and lapping operations of finishing the valve gates 16 and valve seats 21 produce the amorphous hard facing. It is also thought that the severe rubbing occurring during valve operation also enhances the hardness of the coating.

Amorphous hard facings for standard service are typically applied with a HVOF process. For wire shear service, the amorphous hard facings may be applied with the HVOF process, but can also be applied by laser, flame spraying, plasma spraying, etc. The amorphous hard facing may be applied on forged or cast valve gate faces and valve seat faces. To further increase the surface hardness of the facings, the amorphous hard facings may be boronized.

Although the best mode contemplated for carrying out the present invention has been herein shown and described it will be apparent that modification and variation may be made without departing from what is regarded to be the subject matter of the invention.

What is claimed is:

1. A gate valve comprising;
   a valve body,
   a valve seat disposed within said valve body,
   a valve seat face on said valve seat,
   a valve gate disposed within said body and movable between open and closed positions,
   a gate face on said valve gate disposed for sliding contact with said valve seat face as said gate is moved between the open and closed positions, and an amorphous metallic coating disposed on said valve seat face and on said gate face.

2. A leak resistant gate valve as in claim 1 further comprising a boronized coating applied over the amorphous metallic coating.

3. The gate valve of claim 1, in the amorphous metallic coating is comprised of a metamorphic metal hard facing overlay.

4. A gate valve comprising;

a valve body, a valve seat disposed within said valve body and having a valve seat face, a valve gate disposed within said valve body and having a gate face in sliding contact with said valve seat face and being movable between valve open and valve closed positions;

the valve gate face comprising an amorphous metallic coating.

5. The gate valve of claim 4, wherein the amorphous metallic coating is comprised of a metamorphic metal hard facing overlay.

6. A gate valve comprising:

a valve body having an inlet, an outlet and a flow passage extending between the inlet and the outlet;

a pair of gate seats disposed within the valve body, each gate seat including a bore in communication with the flow passage;

a gate located within the valve body between the gate seats, the gate being movable between a first positions wherein the flow passage is open between the inlet and the outlet, and a second position, wherein the gate seals the flow passage between the inlet and the outlet;

wherein at least one of the gate seats comprises a seat face and the gate comprises at least one gate face adjacent the seat face; and wherein the gate face comprises an amorphous metallic gate face coating.

7. The gate valve of claim 6, wherein the seat face comprises an amorphous metallic seat face coating.

8. The gate valve of claim 7, wherein the gate face coating and the seat face coating are between approximately 0.01 and approximately 0.025 inch thick.

9. The gate valve of claim 8, wherein the gate face coating and the seat face coating are boronized.

10. The gate valve of claim 7, wherein the amorphous metallic seat face coating is comprised of a metamorphic metal hard facing overlay.

11. The gate valve of claim 6, wherein the amorphous metallic gate face coating is comprised of a metamorphic metal hard facing overlay.

* * * * *